Patented Oct. 16, 1951

2,571,100

UNITED STATES PATENT OFFICE 2,571,100

VULCANIZABLE RUBBER MIXES AND VULCANIZED RUBBER PRODUCTS MADE THEREFROM

Jean Augustin, Paris, France, assignor to Compagnie Industrielle de Credit, Paris, France No Drawing. Application June 22, 1948, Serial No. 34,560. In France July 29, 1947

13 Claims. (Cl. 260—765)

This invention relates in general to vulcanized rubber mixtures containing a reinforcing filler and in particular to a method for improving such mixtures by the use of acidic organic substances found in certain clays. These acidic substances are bodies of complex organic compounds whose exact composition is not known and which are difficult to relate to substances already known; consequently in the description given hereinafter they will be referred to by the term "acidic extract."

Clays in which organic acidic materials are present are almost always grey or black. Certain grey or black kaolinites are rich in these organic substances. Other types of clays such as the attapulgites, allophanes and halloysites may also contain rather large amounts thereof.

In the past, rubber manufacturers using clay fillers have always abstained from employing clays containing acid substances, preferring instead to use clays in which such substances are absent, because the acidic nature of these materials retards or prevents vulcanisation.

By experimental study the inventor has found that the acidic organic bodies contained in clays have a strengthening effect on rubber fillers and may be readily employed therein, provided that a suitable agent is added to render the rubber mixture vulcanisable.

The presence in certain clays of these so-called acidic extracts and the efficacy of their action may be easily ascertained because these substances are for the most part soluble in certain organic solvents. For instance, the aliphatic ketones having molecular weights between about 86 and about 100 such as diethylketone and its homologues, readily dissolve the major part of this acidic extract, upon heating. Thus it is possible to remove the acidic extract, thereby proving its presence in a given clay, to measure the quantity present, and to study its function and use in the reinforcement of rubber mixtures.

I will now show by way of example, the action of organic substances contained in crypto-crystalline clay, i. e. in clay having as its principal mineral component a very finely divided halloysite whose particles are visible by means of the electron microscope. The total amount of organic substance present in the given clay, as determined by oxydimetric quantitative analysis, is approximately 2.5%. Of this total about 0.8% may be removed from the clay by heating with methyl-isobutyl-ketone or diethyl-ketone. The acidic extract obtained is a brown, viscous mass, insoluble in water, and not very soluble in most organic solvents, with the exception of the heavy ketones. The substance extracted has a marked acidity. Before extraction, the clay has a pH of 3.5 and after extraction its pH increases to 5.5.

A comparison between the properties of the clay before extraction, after extraction, and after extraction and reintroduction of varying quantities of the acidic extract, fully demonstrates the reinforcing effect of such clays on a rubber mixture. It has been found by such comparative tests, that rubbers made with clay from which the acidic extract has been previously removed, show much weaker mechanical properties than rubbers made with whole clay, i. e. clay which has not been subjected to prior removal of the extract. Furthermore, when the acidic extract is added to the rubber mixture, the properties which the clay had before extraction are restored.

A specific example will now be shown in the table hereunder giving the results obtained in tests performed using the following basic formula:

| Mixture component: | Parts by weight |
|---|---|
| Smoked sheets | 100 |
| Zinc oxide | 6 |
| Stearic acid | 3 |
| Pine tar | 2 |
| Sulphur | 2.5 |
| Accelerator G. S. | 0.8 |
| Accelerator D. P. G. | 0.4 |
| Ammonium carbonate | 1.7 |
| Hexamethylenetetramine | 1.7 |

The function of the ammonium carbonate is to counteract the acidity of the extract used and thus to permit proper vulcanisation of the rubber mixture.

To the above basic formula is added:

A—100 parts of whole, non-extract-removed clay
B—100 parts of extract-removed clay
C—100 parts of extract-removed clay plus 1 part of extract and the mixture is vulcanised at 143° C. for 5 minutes. The rubbers obtained show the following characteristics:

| | A | B | C |
|---|---|---|---|
| Shore hardness | 66 | 65 | 65 |
| Breaking stress, in kg./cm.² | 238 | 206 | 240 |
| Breaking elongation, in cm./kg | 450 | 350 | 450 |

Similar results are also observed when acidic extracts are used in conjunction with active fillers of a different nature from the crypto-crystalline clays, for example: blacks, precipitated silica, magnesium carbonate, zinc oxide, etc. Particularly good results are obtained when these acidic extracts are added to rubber mixtures using carbon black fillers. The following example shows the results obtained with a carbon black known under the commercial name of "H. M. F." (high modulus furnace).

*Basic formula*

| | |
|---|---|
| Smoked sheets | 100 |
| Carbon black H. M. F. | 60 |
| Zinc oxide | 6 |
| Stearic acid | 3 |
| Sulphur | 2.5 |
| Pine tar | 2 |
| Accelerator G. S. | 0.8 |
| Accelerator D. P. G. | 0.4 |

Using the above formula as a base, four samples are prepared as follows:

| | Extract | Ammonium carbonate | Hexamethylene tetramine |
|---|---|---|---|
| Sample 1 | | | |
| Sample 2 | | | 1 part |
| Sample 3 | 1 part | 1 part | |
| Sample 4 | 1 part | 1 part | 1 part |

As in the preceding example, the ammonium carbonate serves to counteract the acidic effect of the extract so that vulcanisation may take place. The hexamethylenetetramine is used as a vulcanisation accelerator.

After vulcanisation at 150° C. for 5 minutes, the samples yielded show the following characteristics:

| | 1 | 2 | 3 | 4 |
|---|---|---|---|---|
| Shore hardness | 70 | 70 | 70 | 70 |
| Breaking stress, in kg./cm.$^2$ | 107 | 207 | 196 | 216 |
| Breaking elongation, in cm./kg | 260 | 300 | 260 | 300 |

The present invention may be carried out in several manners.

One method is to find clays containing suitable quantities of the acidic extract and simply use these clays, crushed and reduced to a very finely powdered state. With this method it is necessary to take precautions against the acidic nature of the clay so that proper vulcanisation may take place. For this purpose, suitable ammonium compounds, such as ammonium carbonate, capable of liberating ammonia at vulcanising temperatures, may be added to the rubber mixture.

Another method is to take on the one hand, clays deficient in acidic extract but particularly well suited for use as fillers owing to the shape and fineness of their particles, and on the other hand, clays rich in organic acidic substances but which are too crude or too absorbent to be suitable as fillers; the acidic extract may then be removed from the latter clays and admixed with the former or with any other active filler in a maximum proportion of five parts of extract to 100 parts of filler, by weight.

Since the acidic extract or a clay containing the same tends to retard or hinder vulcanisation, an additional material must always be used in order to counteract this effect, as already explained. However, it is also possible to use this acidic extract in the form of derivatives which do not interfere with vulcanisation, for example: alkaline salts, amine salts, or various metallic salts, esters and anhydrides of said acidic substances, or any other derivative in which the acid function is either checked or neutralized. When such derivatives are employed the necessity of taking special measures to combat the acidic effect of the extract is generally obviated.

A further method of still greater advantage is to employ a crypto-crystalline clay naturally containing active derivatives of the acidic extract and increasing the proportion of these derivatives by the addition of acidic extract obtained from another portion of said clay.

What I claim is:

1. A rubber mix characterized by high strength imparting characteristics and containing a reinforcing filler, a material promoting vulcanisation, and acidic organic substances obtained by extraction of a halloysitic clay rich in organic substances with an aliphatic ketone solvent having a molecular weight between about 86 and about 100.

2. A rubber mix characterised by high strength imparting characteristics and containing a reinforcing filler, a material promoting vulcanisation, and acidic organic substances obtained by extraction of a halloysitic clay rich in organic substances with an aliphatic ketone solvent having a molecular weight between about 86 and about 100, said acidic organic substances being present in a proportion of about 5 parts thereof to 100 parts of the filler.

3. A rubber mix characterized by high strength imparting characteristics and containing clay as a reinforcing filler and acidic organic substances obtained by extraction of a halloysitic clay rich in organic substances with an aliphatic ketone solvent having a molecular weight between about 86 and about 100.

4. A rubber mix characterized by high strength imparting characteristics and containing a material promoting vulcanization, a filler composed at least in large part of a clay containing acidic organic substances obtained by extraction of a halloysitic clay rich in organic substances with an aliphatic ketone solvent having a molecular weight between about 86 and about 100.

5. A rubber mix characterized by high strength imparting characteristics and containing a reinforcing filler, a material promoting vulcanization, acidic organic substances obtained by extraction of a halloysitic clay rich in organic substances with an aliphatic ketone solvent having a molecular weight between about 86 and about 100, and a sufficient amount of an alkaline substance substantially to neutralize the acidic organic substances present.

6. A rubber mix characterized by high strength imparting characteristics and containing a material promoting vulcanization, a filler composed at east in large part of a clay containing acidic organic substances obtained by extraction of a halloysitic clay rich in organic substances with diethyl-ketone.

7. A rubber mix characterized by high strength imparting characteristics and containing a material promoting vulcanization, a filler composed at east in large part of a clay containing acidic organic substances obtained by extraction of a halloysitic clay rich in organic substances with methyl-isobutyl-ketone.

8. The vulcanized rubber product resulting from the vulcanization of a rubber mix containing a reinforcing filler, a material promoting vulcanization and acidic organic substances obtained by extraction of a halloysitic clay rich in organic substances with an aliphatic ketone solvent having a molecular weight between about 86 and about 100.

9. The vulcanized rubber product resulting from the vulcanization of a rubber mix containing clay as a reinforcing filler and acidic organic substances obtained by extraction of a halloysitic clay rich in organic substances with an aliphatic ketone solvent having a molecular weight between about 86 and about 100.

10. The vulcanized rubber product resulting from the vulcanization of a rubber mix containing a material promoting vulcanization and a filler composed at least in large part of a clay containing acidic organic substances obtained by extraction of a halloysitic clay rich in organic substances with an aliphatic ketone solvent having a molecular weight between about 86 and about 100.

11. The vulcanized rubber product resulting from the vulcanization of a rubber mix containing a reinforcing filler, a material promoting vulcanization and acidic organic substances obtained by extraction of a halloysitic clay rich in organic substances with an aliphatic ketone solvent having a melocular weight between about 86 and about 100.

12. The vulcanized rubber product resulting from the vulcanization of a rubber mix containing a material promoting vulcanization and a filler composed at least in large part of a clay containing acidic organic substances obtained by extraction of a halloysitic clay rich in organic substances with diethyl-ketone.

13. The vulcanized rubber product resulting from the vulcanization of a rubber mix containing a material promoting vulcanization and a filler composed at least in large part of a clay containing acidic organic substances obtained by extraction of a halloysitic clay rich in organic substances with methyl-isobutyl-ketone.

JEAN AUGUSTIN.

REFERENCES CITED

The following references are of record in the file of this patent:

UNITED STATES PATENTS

| Number | Name | Date |
|---|---|---|
| 91,216 | Dickenson | June 4, 1869 |
| 1,538,060 | Schidrowitz | May 19, 1925 |
| 2,103,461 | Hock et al. | Dec. 28, 1937 |
| 2,210,763 | King et al. | Aug. 6, 1940 |
| 2,261,260 | Kraus | Nov. 4, 1941 |
| 2,307,239 | Rowland | Jan. 5, 1943 |